Figure 6:
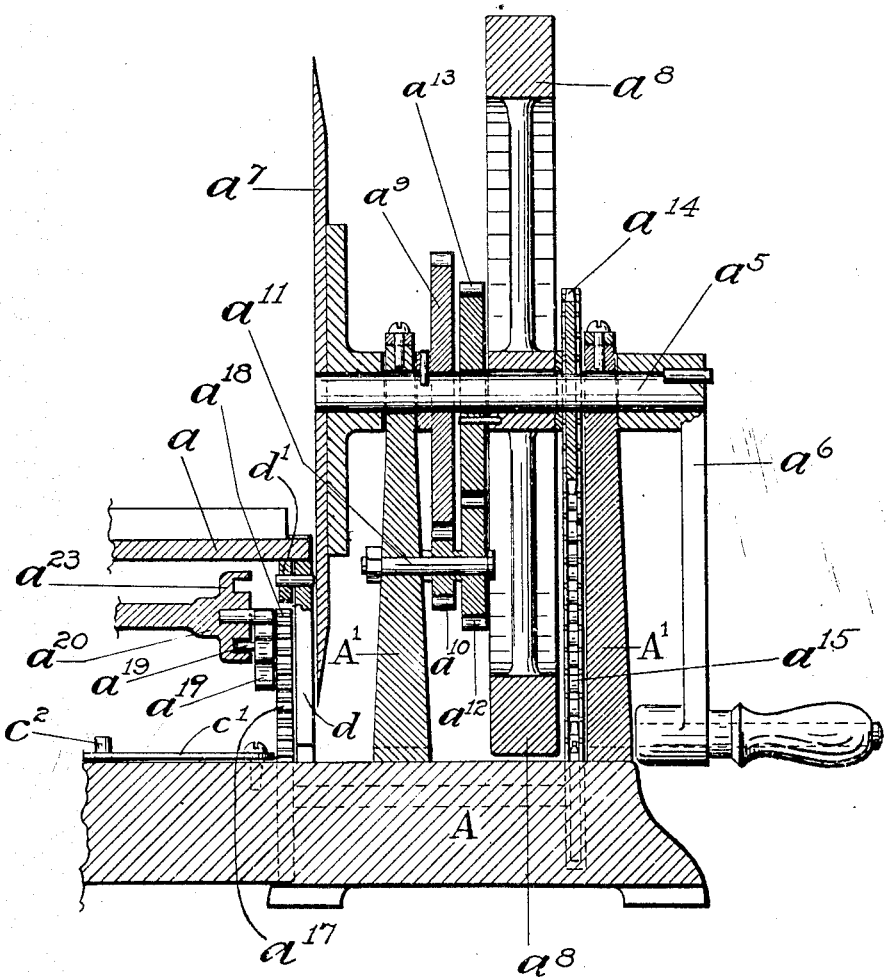

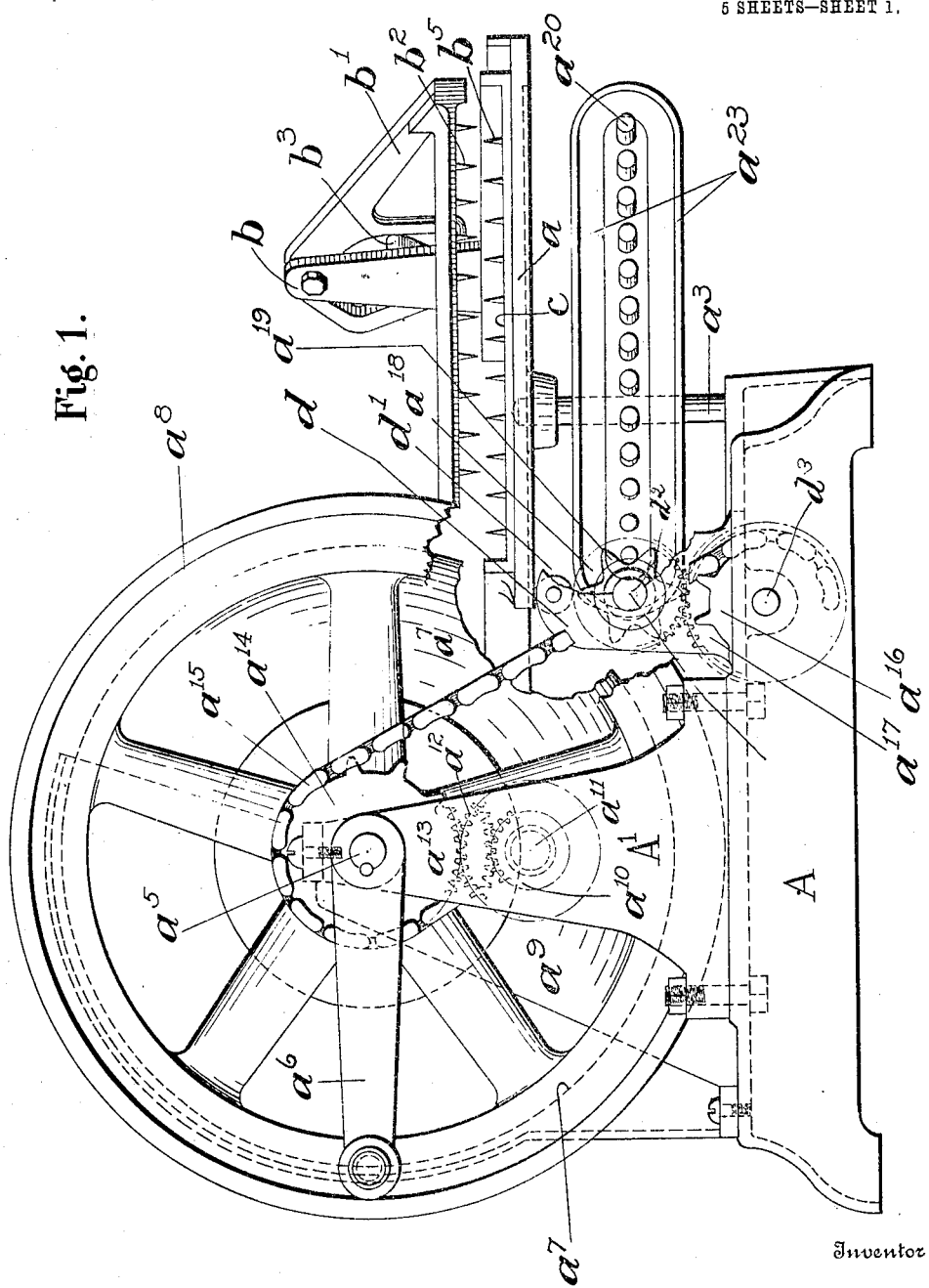

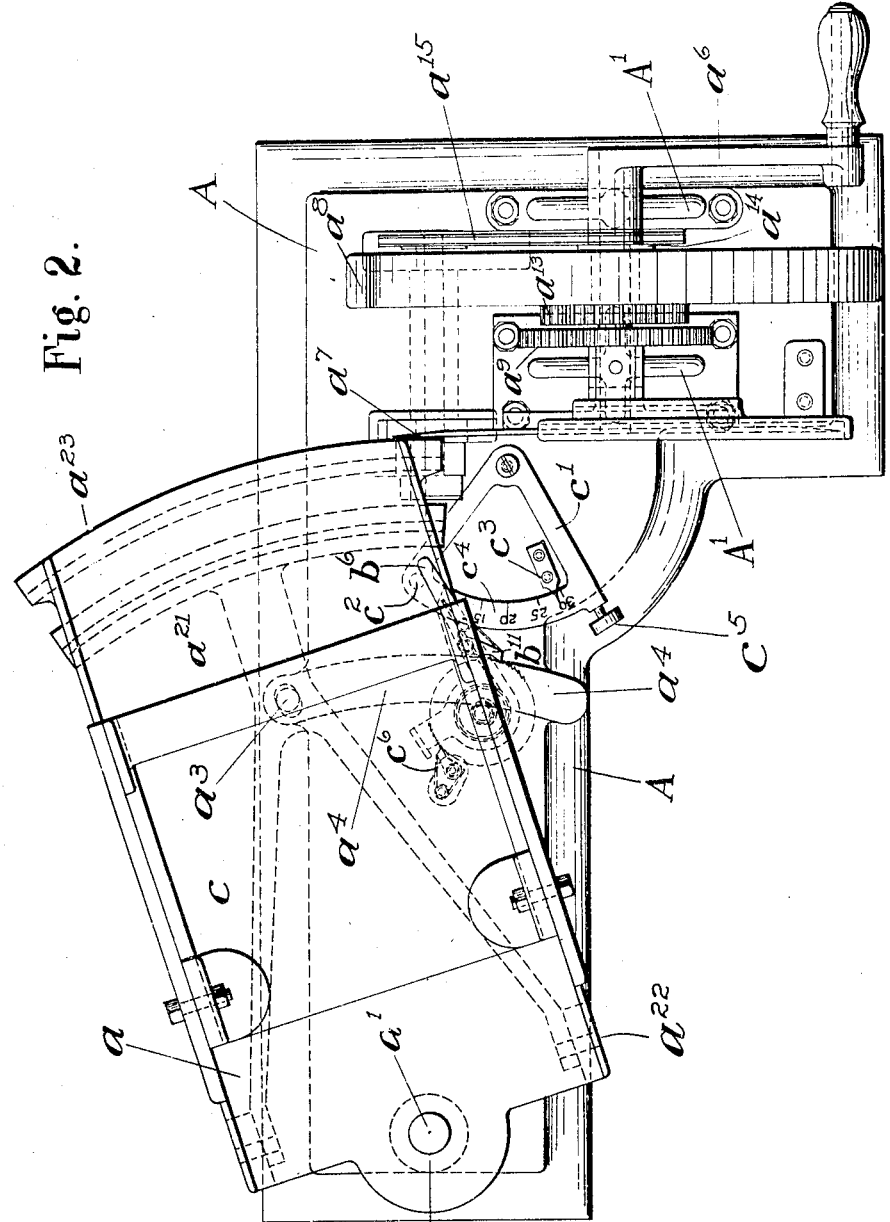

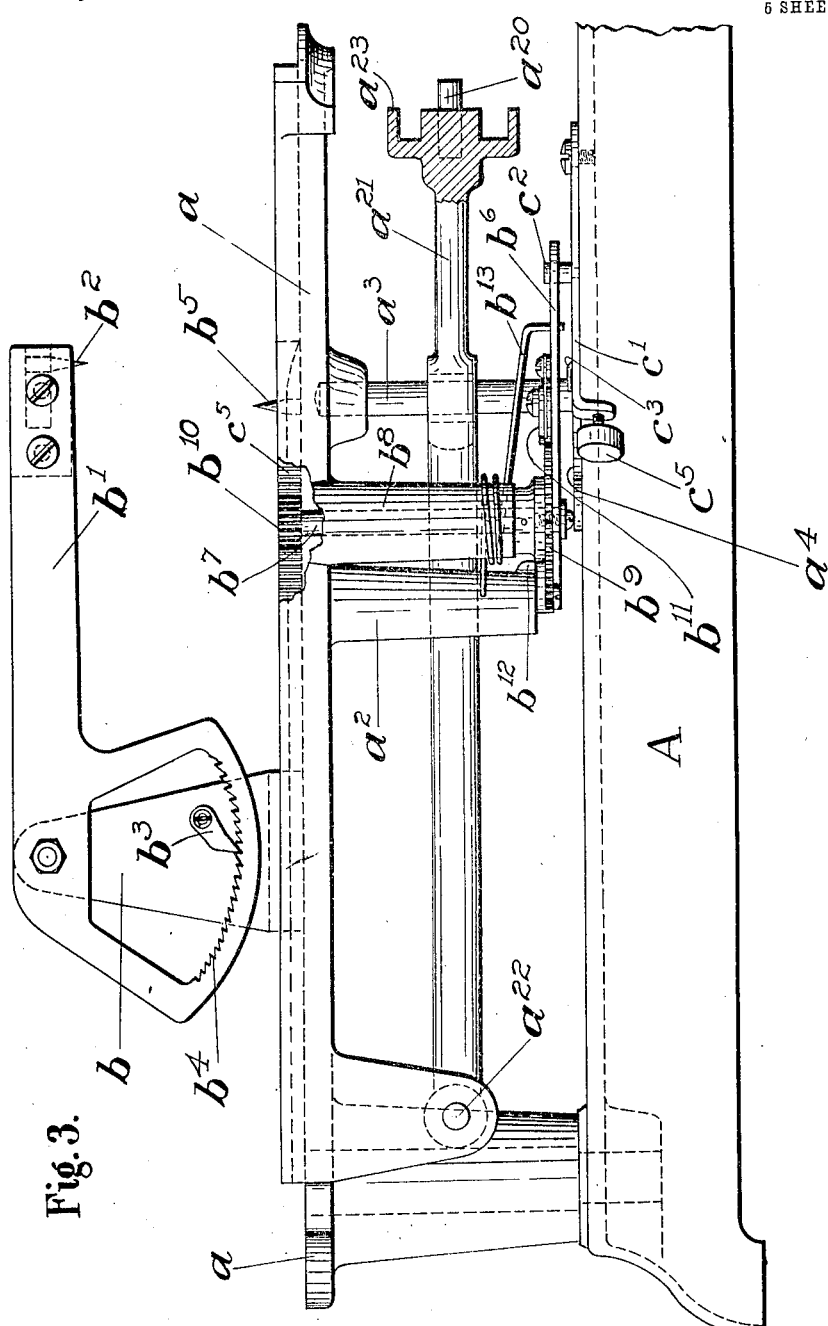

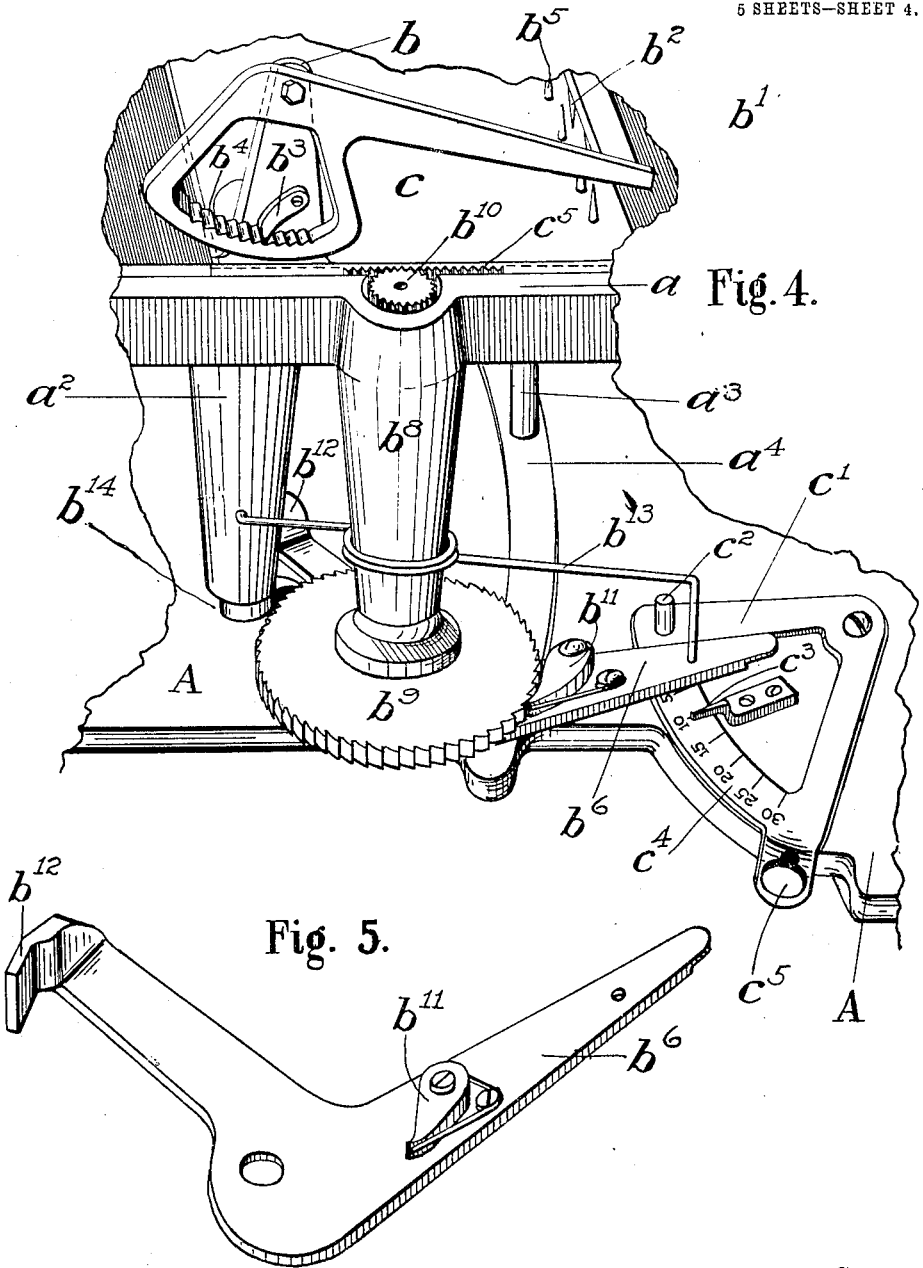

UNITED STATES PATENT OFFICE.

WALTER G. DOTY, OF DAYTON, OHIO.

MACHINE FOR CUTTING MEAT.

No. 913,879.

Specification of Letters Patent.

Patented March 2, 1909.

Application filed April 4, 1907. Serial No. 366,368.

*To all whom it may concern:*

Be it known that I, WALTER G. DOTY, a citizen of the United States, residing at Dayton, in the county of Montgomery and State of Ohio, have invented certain new and useful Improvements in Machines for Cutting Meat, of which the following is a specification.

My invention relates to machines for cutting meat and similar articles, the object of the invention being particularly to provide a machine for accurately slicing meats into slices of the desired thickness or thinness, the machine being one which is simple in its construction and effective in operation, all of the parts being readily accessible for cleaning and the driving mechanism being so formed that it will operate freely and easily and secure the most effective work by the least expenditure of power. I attain these objects by the construction shown in the accompanying drawings, in which—

Figure 1 is a side view taken from the right-hand side of Fig. 2, showing some of the parts broken away. Fig. 2 is a plan view. Fig. 3 is a detail view of the platform and devices connected therewith, the other parts being shown in section. Fig. 4 is a detail view of the mechanism for giving the step-by-step movement to the slide. Fig. 5 is a detail view of the pawl arm. Fig. 6 is a sectional view of the gear and connection between the fly-wheel and operating shaft.

Like parts are indicated by like letters of reference throughout the several views.

The frame of the machine is indicated by A and the platform by $a$. This platform is pivoted at $a^1$ (Fig. 2) and is capable of an oscillating movement, as will be more fully explained. The platform carries a downward projecting support, $a^4$, and an arm, $a^3$. The free end of the arm, $a^3$, slides over a bearing surface or track $a$ on the main frame A. (See Fig. 3). The main operating shaft is indicated by $a^5$. (See Fig. 6). This shaft is rigidly secured at one end to the crank arm, $a^6$, which furnishes means for continuously rotating the operating shaft, $a^5$. This shaft is journaled loosely in the frame supports, A$^1$ A$^1$, and at its other end has rigidly secured thereto a rotary cutter, $a^7$. Intermediate the frame supports, A$^1$ A$^1$, there is a gear connection to the fly-wheel, $a^8$, which is loosely journaled on said operating shaft, $a^5$. The large gear wheel, $a^9$, is rigidly secured to the shaft, and an intermediate gear, $a^{10}$, is loosely journaled on a stud, $a''$, projecting from one of the frame supports A$^1$. The gear, $a^{10}$, is connected to a larger gear, $a^{12}$, which in turn meshes with a larger gear wheel, $a^{13}$, journaled loosely on the shaft, $a^5$, and rigidly secured to the fly wheel, $a^8$. Consequently, when the main operating shaft rotates the cutter, $a^7$, and the gear $a^9$ rotates therewith, the motion of the shaft will be transmitted to the fly-wheel, $a^8$, through the intermediate gears, $a^{10}$, $a^{12}$ and $a^{13}$ at a much higher speed.

The main shaft, $a^5$, is provided with a sprocket wheel, $a^{14}$, and a sprocket chain, $a^{15}$, connects said main shaft to the sprocket wheel, $a^{16}$, (Figs. 6 and 1), which sprocket wheel is connected to a gear, $a^{17}$, by a shaft, $d^3$, which gear is shown in mesh with the gear, $a^{18}$, secured rigidly to a shaft, $d^2$, said gear, $a^{18}$, being rigidly connected to a pinion, $a^{19}$. Each of the shafts $d^2$ and $d^3$ are suitably supported and journaled on the main frame A. The pinion, $a^{19}$, is preferably formed with teeth of a large pitch adapted to engage with a series of pins or studs forming a rack, $a^{20}$. The shaft, $d^2$, is preferably extended beyond the pinion, $a^{19}$, so as to engage in a cam track, $a^{23}$, formed in the arm, $a^{21}$, which carries the rack, $a^{20}$. The arm, $a^{21}$, is pivoted to the table at $a^{22}$, so that it will move with the table but can rise and fall to permit the rack to be raised above or depressed below the pinion, $a^{19}$, and thus produce a back and forth movement of the arm and table, as before stated.

The end of the arm, $a^{21}$, carries the track, $a^{22}$, (see Fig. 2), and the rack, $a^{20}$, is located centrally of this track so that when the pinion, $a^{19}$, continues its revolution, the pinion will force the arm, $a^{21}$, downwardly and will lie on the upper part of the rack, $a^{20}$, until it reaches a point opposite that shown in Fig. 1 when the arm, $a^{21}$, will be elevated by the end of the shaft, $d^2$, (Fig. 6) and the pinion will lie on the lower part of the track and by the meshing with the rack return the table to normal position—the position shown in Fig. 2. During this oscillating movement of the table, the projecting support, $a^3$, will slide upon the bearing surface, $a^4$, and I have shown the opening in the arm, $a^{21}$, through which the support, $a^3$, passes, sufficiently large to permit the arm, $a^{21}$, to have necessary vertical movement. (See Figs. 2 and 3). The connections for transmitting movement from the fly-wheel to the slide, $c$, which is supported on the table $a$ in order to give the slide a step-by-step movement is illustrated in Figs. 2, 4 and 5. It is further to be understood that the slide, $c$, is adapted to support the article to be cut, and has a step-by-step movement sufficient to feed the article to the cutter. In order to hold the article securely on the slide, $c$, I have shown an upright $b$, (Fig. 3) upon which is pivoted a pressure arm, $b^1$, formed with projecting pins, $b^2$. There is a pawl, $b^3$, pivoted to the arm, $b$, adapted to engage the rack, $b^4$, formed in the lower part of the arm, $b^1$, and by placing the article, such as meat, on the slide, $c$, so that the article will rest upon the pins, $b^5$, thereon the arm, $b^1$, can readily be set so that this article will be held securely on the slide. In order to give the proper step-by-step movement to the slide, I have shown a pawl arm, $b^6$, (Figs. 4 and 5). This arm is loosely supported on the end of the upright shaft, $b^7$, (Fig. 3) which shaft is supported within the housing, $b^8$, (Fig. 4), and this housing is formed integral with the table $a$. To the lower end of the shaft, $b^7$, is rigidly secured a ratchet wheel, $b^9$, and on the upper end of the shaft is rigidly secured a pinion, $b^{10}$, (Fig. 3). A spring-pressed pawl, $b^{11}$, (Fig. 5) carried on the pawl arm, $b^6$, engages the ratchet wheel, $b^9$, and when the pawl arm, $b^6$, is advanced, the pawl, $b^{11}$, will advance the ratchet wheel and the pinion, $b^{10}$, will be correspondingly moved. The pawl arm, $b^6$, carries at its one end a stop, $b^{12}$, which stop is adapted to limit the retracting movement of the pawl arm. A spring, $b^{13}$ (Fig. 4) normally holds the pawl arm in retracted position, and the stop, $b^{12}$, will be thrown against the projecting support, $b^3$, which projects from the table $a$ a holding pawl, $b^{14}$, on said support preventing the ratchet wheel $b^9$, from turning. It is apparent from this description that the pawl arm and gear, pinion, spring, and kindred parts, are all carried by the table, $a$, and movable with the table.

There is pivoted a sector-shaped piece, $c^1$, to the stationary frame, A, of the machine, and a pin, $c^2$, projects upwardly from said piece, $c^1$, in the path of movement of the pawl arm, $b^6$. Consequently, when the table, $a$, is oscillated, the end of the arm, $b^6$, will strike the pin, $c^2$, and the arm will be advanced to a limited extent, thereby partially rotating the pinion, $b^{10}$. When the table is returned to normal position, the spring, $b^{13}$, will retract the pawl arm, $b^6$, to its normal position.

In order to vary the amount of the movement given the pinion, $b^{10}$, by the pawl arm, $b^6$, I have shown a pivoted sector-shaped piece, $c^1$, in combination with a stationary pointer, $c^3$. The sector preferably has a graduated scale, $c^4$, which when the sector is moved to different position, coöperates with the pointer to indicate the amount of movement to be given to the pinion, $b^{10}$. This pinion coöperates with the rack, $c^5$, formed on the slide, $c$, so that when the pinion is moved the slide will correspondingly move. In this manner I am able to advance the slide by a step-by-step movement toward the cutter, $a^7$. The spring-pressed pawl, $c^3$, (Fig. 2) is employed to prevent the return movement of the ratchet, $b^9$, and pinion, $b^{10}$, thereby insuring an intermittent advancing movement of the slide. By this construction I have connected the fly wheel and shaft with the table and slide so that by the continuous rotating movement of the fly-wheel and shaft there is transmitted an oscillating movement to the table and a step-by-step movement to the slide, the cutter, $a^7$, being operated directly by the shaft.

The table in its movement back and forth is supported immediately under the point where the cutting is done by a roller, $d^1$, which is preferably mounted on a support, $d$, on the main frame. This gives the table a very rigid support while allowing it to move freely back and forth, the support being located just at the point where the pressure would come against the table from the cutting operation.

It should be noted also that all of the parts, including the fly-wheel and the crank, are located above the bottom of the main frame so that the device as a whole can be placed upon a counter or any other support without any overhanging parts to interfere.

It will be understood that the adjustment in the step-by-step movement of the slide to secure a thin or thicker cut is secured by moving the sector, $c^1$, to different positions indicated by the graduated scale. This moves the stop, $c^2$, to different positions in the line of travel of the pawl arm, $b^6$, so that the said arm will contact with said stop sooner or later as the table oscillates, and thus produce a greater or less movement of the arm and consequently of the slide. Means are provided for securing the sector in different positions of adjustment as shown at $c^5$. As shown in the drawings, particularly Fig. 2, the pivotal point of the table is shown on a line parallel with the main operating shaft and passing just slightly back of the cutting edge of the knife. The table is necessarily curved on its forward edge to permit it to oscillate and pass the cutting edge of the knife, and by reason of this curvature furnishes a perfect clearance between the cutting edge and the article being cut, thus permitting the use of a straight knife where heretofore concave or disk-shaped cutters have been employed. This arrangement of the table and knife also secures a clean cut of any desired thickness.

Having thus described my invention, I claim:

1. In a meat cutting machine, an oscillating table, the forward edge of which is formed on a curve and supported by a supporting roller, a main operating shaft, a cutting blade secured directly to said shaft, a flywheel, an intermediate gear connection between the fly-wheel and shaft to cause said fly-wheel to revolve at a greater speed than said shaft, a movable arm on said table carrying teeth or projections in the nature of a rack a pinion adapted to be engaged on opposite sides by said rack to cause said table to ocsillate from a continuous movement of said pinion, and means for driving said pinion continuously from the movement transmitted from said main shaft, substantially as specified.

2. In a meat cutting machine, the combination of a table capable of oscillating movement, an arm carried by said table, a rotating shaft having a cutting blade, teeth on said arm, a pinion adapted to engage said teeth, and means for causing said arm to move to opposite sides of said pinion, connections from said shaft to said table, and means for supporting said table adjacent to the meeting point between said blade and table, as specified.

3. In a meat cutting machine, the combination of a table capable of oscillating movement, a pivoted arm projecting from said table, teeth on said arm, a pinion adapted to engage said teeth, and means for causing said arm to be moved to a position above and below said pinion to cause the teeth to be engaged on opposite sides thereof, a rotating shaft carrying a cutting blade, means for imparting motion to said shaft and blade, and a connection from said shaft to said pinion, as and for the purpose specified.

4. In a meat cutting machine, the combination with a rotary knife and an oscillating table, an arm carried by said table and adapted to move rigidly with said table in its oscillating movement but pivoted thereto to permit a vertical movement of said arm, a rack carried by said arm, a pinion to engage said rack, said pinion being connected to the driving connection of said knife, and a cam-track operating in connection with said pinion to cause said arm to be raised and depressed to bring said rack above and below said pinion, respectively, to secure oscillating movement of said table.

5. In a meat cutting machine, the combination of a rotary knife and its driving mechanism, of a pivoted table adapted to oscillate in front of said knife, a fly-wheel mounted loosely on the shaft which carries the knife, and a driving connection between said shaft and said fly-wheel to cause said fly-wheel to rotate at a greater speed than the speed of said knife, a otary pinion under said table, means for imparting rotary movement to said pinion from said driving mechanism, a pivoted arm carried by said table, and means for causing said arm to move vertically above and below said pinion, and teeth on said arm adapted to be engaged by said pinion and from opposite sides thereof to cause said table to oscillate from the continuous rotary movement of said pinion, substantially as specified.

6. In a meat cutting machine, the combination of a supporting table, a slide on said table, stationary projections on said slide and pivoted arms mounted on said slide in a plane at right-angles to the plane of said slide, said pivoted arms being adapted to project over the stationary projections and provided at their opposite ends with a segmental ratchet and pawl to hold them in different positions of adjustment.

7. The combination with the oscillating table, a slide thereon, a rack on said slide and a pinion mounted on said table, means for imparting motion to said pinion which comprises a ratchet-wheel and a spring pressed pawl-carrying arm, a stop on said pawl-carrying arm to engage a projection on said table, a movable sector mounted independently of said table and carrying a stop to engage said pawl-carrying arm, and means for adjusting said sector to produce movements of different lengths of said pawl-carrying arm by the oscillations of said table.

8. In combination with the oscillating table, a slide having a stationary projection and the pivoted arms with ratchet teeth above said slide, a series of teeth on said slide and a pinion mounted on said table to engage said teeth, a pawl-carrying arm and ratchet also mounted on said table, and a connection between said ratchet and pinion, a spring for moving said pawl-carrying arm in one direction and a projection adapted to engage said arm and move it in the opposite direction when said table is oscillated, and means for adjusting the movement of said pawl-carrying arm, as specified.

In testimony whereof, I have hereunto set my hand this 18th day of March, 1907.

WALTER G. DOTY.

Witnesses:
D. A. DE VANNEY,
H. M. WALSH.